UNITED STATES PATENT OFFICE.

ALWIN MITTASCH AND CHRISTIAN SCHNEIDER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF PRODUCING HYDROGEN 1,128,804.   Specification of Letters Patent.   Patented Feb. 16, 1915.

No Drawing.   Application filed October 20, 1913.   Serial No. 796,122.

*To all whom it may concern:*

Be it known that we, ALWIN MITTASCH and CHRISTIAN SCHNEIDER, citizens of the German Empire, residing at Ludwigshafen-on-the-Rhine, Germany, have invented new and useful Improvements in Processes of Producing Hydrogen, of which the following is a specification.

It is known that hydrogen in admixture with carbon monoxid and carbon dioxid can be obtained from hydrocarbons, such for instance as methane or gases containing methane and in particular gases of this type which occur in nature, by passing such methane or gases containing methane in admixture with steam over a catalytic agent, but the results hitherto obtained have proved unsatisfactory. Among other catalysts for this purpose it has been proposed to make use of a very thin sheet of wire netting made of nickel, cobalt, or platinum which is placed perpendicularly to the current of gas, by this means avoiding the formation of carbon monoxide.

We have now found that the conversion of hydrocarbons and steam into hydrogen and carbon monoxid or carbon dioxid can be carried out easily, rapidly and completely by employing a nickel catalytic agent distributed on a fireproof carrier and by working at a temperature above that of dark redness, that is to say above 700° C. During the reaction it is possible that the nickel or compound thereof which is employed is converted into an oxid of nickel, or, vice versa, it is also possible that the oxid, or other compound, of nickel is reduced to the metallic form, or to a compound thereof containing carbon, so that it is equivalent whether metallic nickel, or nickel oxid, or other suitable nickel compound be taken at the commencement of the reaction. Such carriers preferably are employed as do not react with nickel oxid under the conditions obtaining during the reaction, since the contact mass then retains its activity even after being employed for a long time.

When working according to the present invention, a gas mixture free from or containing only small quantities of hydrocarbons results and after removal of the carbon monoxid and carbon dioxid gives rise to hydrogen which is suitable, for instance, for the catalytic production of ammonia, or for reducing fats.

The process herein described is preferably carried out in upright furnaces or tubes lined with fireproof material. The necessary heat can be applied internally, for instance, by burning hydrocarbons or the like in the reaction space and this heating can be carried on before or during the actual production of hydrogen. It is particularly advantageous to pass alternately mixtures of hydrocarbon or other fuel and air, and hydrocarbon and steam, into the reaction space since by this means it is easy to maintain the requisite temperature. The heat contained in the gases leaving the reaction space can be used to preheat the gas mixture about to enter the furnace. The gas mixture obtained, in so far as it contains carbon monoxid, if necessary after adding a further quantity of steam, can be passed over suitable contact agents, for instance as described in the specification of the application for patent Serial No. 776,548, in order to convert the carbon monoxid into carbon dioxid.

The following example will serve to illustrate further the nature of this invention, but the invention is not confined to this example: Bring magnesia into suitable shapes, or lumps, which then burn at a high temperature, soak the said lumps with nickel nitrate so that the magnesia contains from about 2% to 5% of nickel, and then, after heating to decompose the nitrate, place the product in a suitable contact furnace and pass a mixture containing methane and steam over it at from 800° to 1,000° C. The reaction takes place rapidly and the activity of the catalytic agent does not diminish. Another method of producing a catalyst consists in precipitating metallic nickel on a carrier by the decomposition of nickel carbonyl.

Instead of gaseous hydrocarbons, either liquid or solid hydrocarbons can be used, in which case the latter are first vaporized or are injected directly into the reaction space, or the pipes leading to the reaction space. Further, mixtures containing hyrocarbons can be employed, and, as an instance of such a mixture, we mention coal gas. If desired, the nickel can be used in admixture with other metals or metallic oxids.

Now what we claim is:—

1. The process of producing hydrogen by passing a hydrocarbon and steam over a nickel catalytic agent distributed on a fireproof carrier and carrying out the reaction at a temperature above 700° C.

2. The process of producing hydrogen by passing a hydrocarbon and steam over a nickel catalytic agent distributed on a fireproof carrier which is incapable of reacting with nickel oxid, and carrying out the reaction at a temperature above 700° C.

3. The process of producing hydrogen by passing a hydrocarbon and steam over a nickel catalytic agent distributed on a fireproof carrier which is incapable of reacting with nickel oxid, while producing the temperature necessary for the reaction by the combustion of hydrocarbon, and carrying out the reaction at a temperature above 700° C.

4. The process of producing hydrogen by passing a hydrocarbon and steam over nickel distributed on a fireproof carrier and carrying out the reaction at a temperature above 700° C.

5. The process of producing hydrogen by passing a hydrocarbon and steam over nickel oxid distributed on magnesia and carrying out the reaction at a temperature above 700° C.

6. The process of producing hydrogen by passing a mixture containing methane and steam over nickel oxid distributed on magnesia while employing a temperature of from 800° to 1,000° C.

In testimony whereof we have hereunto set our hands in the presence of two subscribing witnesses.

ALWIN MITTASCH.
CHRISTIAN SCHNEIDER.

Witnesses:
J. ALEC. LLOYD,
HUGO MORANE.